(12) United States Patent
Tully et al.

(10) Patent No.: US 9,838,242 B2
(45) Date of Patent: Dec. 5, 2017

(54) FLOWLET-BASED PROCESSING WITH KEY/VALUE STORE CHECKPOINTING

(71) Applicant: Jetflow Technologies, Jiangsu Province (CN)

(72) Inventors: John Tully, Newark, DE (US); Brian E. Heilig, West Berlin, NJ (US); Guang R. Gao, Newark, DE (US)

(73) Assignee: JETFLOW TECHNOLOGIES, Nanjing (CN)

( * ) Notice: Subject to any disclaimer, the term of this patent is extended or adjusted under 35 U.S.C. 154(b) by 251 days.

(21) Appl. No.: 14/689,197

(22) Filed: Apr. 17, 2015

(65) Prior Publication Data

US 2015/0244558 A1 Aug. 27, 2015

Related U.S. Application Data

(63) Continuation-in-part of application No. 14/054,112, filed on Oct. 15, 2013.

(60) Provisional application No. 61/748,233, filed on Jan. 2, 2013, provisional application No. 61/713,957, filed on Oct. 15, 2012.

(51) Int. Cl.
*H04L 29/08* (2006.01)
*G06F 9/46* (2006.01)
*H04L 29/06* (2006.01)

(52) U.S. Cl.
CPC .......... *H04L 29/08882* (2013.01); *G06F 9/46* (2013.01); *H04L 67/28* (2013.01); *H04L 67/288* (2013.01); *H04L 69/14* (2013.01)

(58) Field of Classification Search
CPC ...................................................... H04L 29/08

USPC .......................................................... 709/201
See application file for complete search history.

(56) References Cited

U.S. PATENT DOCUMENTS

| | | |
|---|---|---|
| 5,894,547 A | 4/1999 | Baskey |
| 6,438,586 B1 | 8/2002 | Hass et al. |
| 2006/0112297 A1 | 5/2006 | Davidson |
| 2006/0221820 A1 | 10/2006 | Zeitak |
| 2007/0081513 A1 | 4/2007 | Torsner |
| 2008/0086442 A1 | 4/2008 | Dasdan et al. |
| 2008/0270424 A1 | 10/2008 | Lee et al. |
| 2009/0125553 A1 | 5/2009 | Dickinson |
| 2009/0282048 A1* | 11/2009 | Ransom ............ G06F 17/30094 |
| 2009/0307277 A1* | 12/2009 | Grubov ............... G06F 11/1451 |
| 2012/0137164 A1* | 5/2012 | Uhlig ..................... G06F 11/004 714/4.11 |
| 2013/0086018 A1 | 4/2013 | Horii |
| 2014/0108489 A1 | 4/2014 | Glines et al. |

(Continued)

OTHER PUBLICATIONS

Office Action dated Sep. 15, 2016 in U.S. Appl. No. 14/054,112, by Glines.

(Continued)

*Primary Examiner* — David Lazaro
*Assistant Examiner* — Zia Khurshid
(74) *Attorney, Agent, or Firm* — Ladas & Parry LLP

(57) ABSTRACT

A data processing task may be implemented in a distributed computing system by the use of a workflow broken into flowlets that are arranged in a directed acyclic graph between data sources and data sinks. Such an arrangement may include various flow control and/or fault tolerance schemes, among other features. Fault tolerance may be implemented using key/value store (KVS) flowlets.

13 Claims, 20 Drawing Sheets

(56) References Cited

U.S. PATENT DOCUMENTS

2015/0244558 A1    8/2015   Tully et al.

OTHER PUBLICATIONS

Int'l Search Report and Written Opinion dated Sep. 22, 2016 in Int'l Application No. PCT/CN2016/079434.
Dean et al., "MapReduce: Simplified Data Processing on Large Clusters," (2004) OSDI.
Office Action dated Nov. 13, 2015 in U.S. Appl. No. 14/054,112.

* cited by examiner

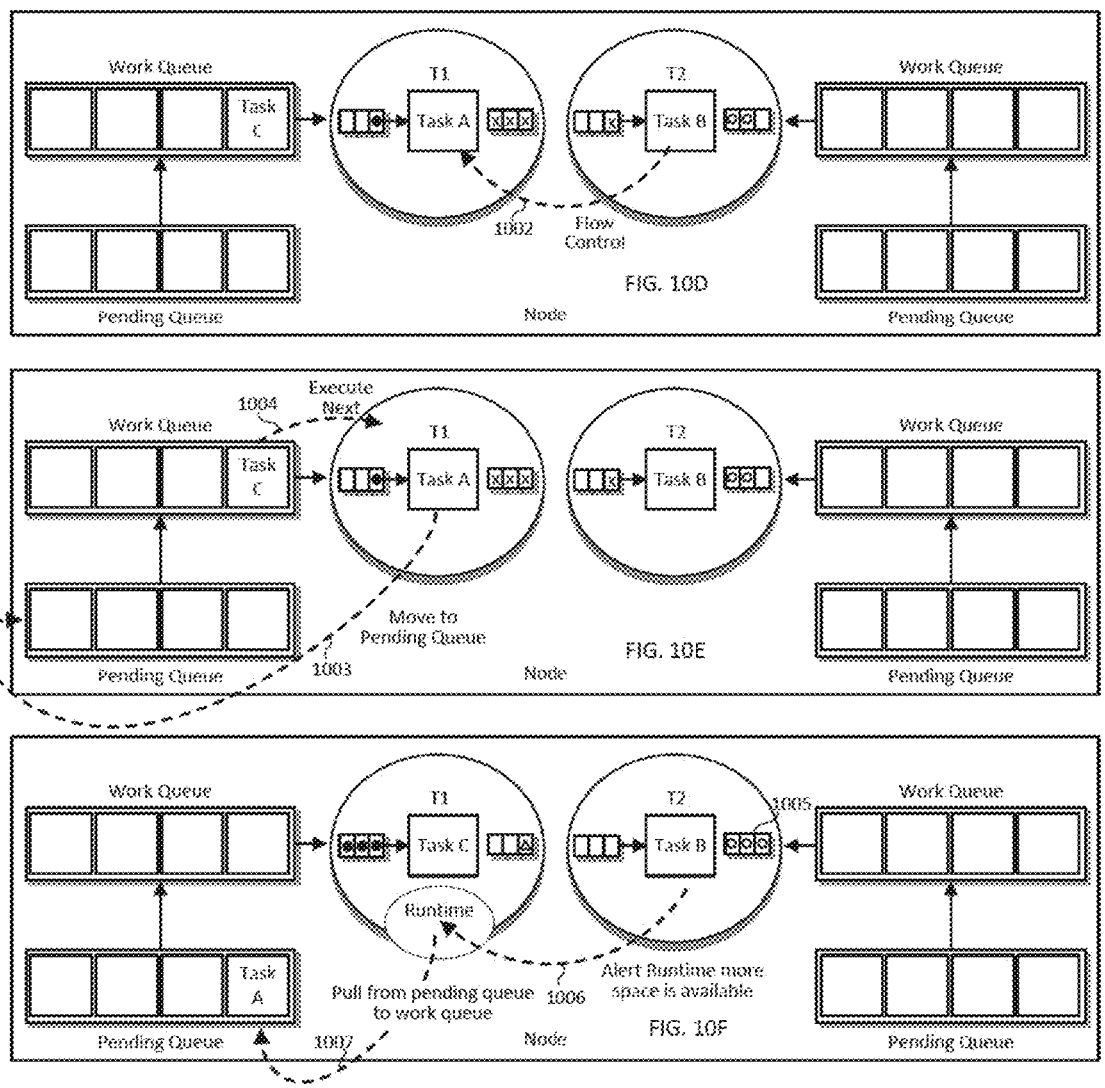

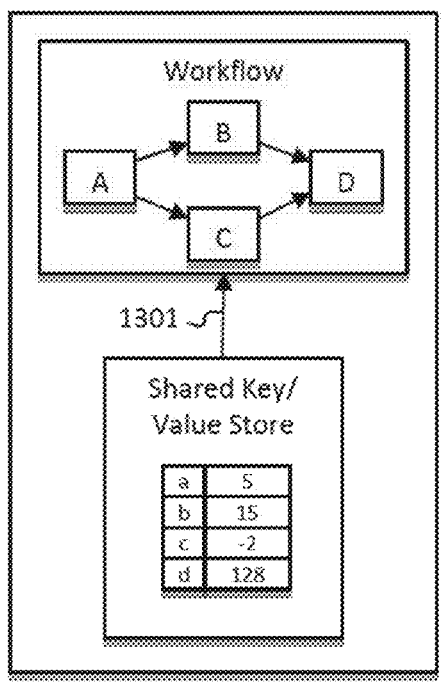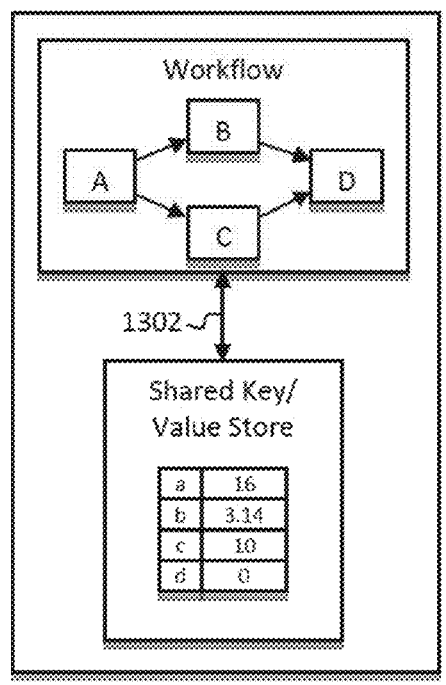
FIG. 13A
FIG. 13B

FLOWLET-BASED PROCESSING WITH KEY/VALUE STORE CHECKPOINTING

CROSS-REFERENCE TO RELATED APPLICATIONS

This application is continuation-in-part of U.S. patent application Ser. No. 14/054,112, filed on Oct. 15, 2013 and currently pending, which is a non-provisional application claiming priority to U.S. Provisional Patent Application Nos. 61/713,957, filed Oct. 15, 2012, and 61/748,233, filed Jan. 2, 2013, the contents of all of which are incorporated herein by reference.

Additionally, the contents of the following further U.S. patent applications are also incorporated by reference herein: U.S. patent application Ser. No. 13/086,132, filed Apr. 13, 2011; U.S. patent application Ser. No. 13/548,805, filed Jul. 13, 2012; U.S. patent application Ser. No. 13/218,082, filed Aug. 25, 2011; and U.S. patent application Ser. No. 13/328,570, filed Dec. 16, 2011.

FIELD OF ENDEAVOR

Various aspects of this application may relate to high-performance computing systems.

BACKGROUND DISCUSSION

Data sets requiring analysis have greatly increased in size over the years, and computing systems and strategies have been designed to try and keep up with the increase in data set size. However, present systems continue to lag in performance behind the pace at which data set sizes increase.

MapReduce techniques as discussed, e.g., in U.S. Patent Application Publication No. 2008/0086442 and/or Dean et al., "MapReduce: Simplified Data Processing on Large Clusters," OSDI 2004, provide one way to approach large data set processing. However, such existing techniques could be made faster and more efficient.

Furthermore, specific applications/algorithms, when implemented with a MapReduce programming model, may have synchronization points (barriers) within a workflow in which one stage cannot begin until another stage is completely finished processing. This may also cause inefficiencies.

SUMMARY

Various aspects of the present application may relate to techniques by which to address the above-mentioned limitations of existing large data analysis techniques, and/or to generally provide a high-performance computing environment. The techniques described herein, which may involve the use of something called a "flowlet," which will be discussed in further detail below, may be implemented using hardware, software, firmware and/or combinations thereof. Types of flowlets may include KeyValueStore flowlets and/or other types of flowlets. KeyValueStore (KVS) flowlets may be used in fault tolerance techniques.

BRIEF DESCRIPTION OF THE DRAWINGS

Various aspects of this disclosure will now be described in conjunction with the accompanying drawings, in which:

FIGS. 10A-10H show examples of processing scenarios at a computing node;

FIGS. 13A and 13B show examples of key/value data stores;

DETAILED DESCRIPTION OF VARIOUS ASPECTS OF THE DISCLOSURE

In general, use of flowlets may facilitate techniques for processing data in a distributed computing system in the form of a workflow that may consist of multiple dataflow actors (called flowlets, which will be discussed further below) that may contain user defined functions (UDF) from one or more data sources to one or more data sinks. Various aspects of these concepts and how they interact will be discussed below.

Figure 1:
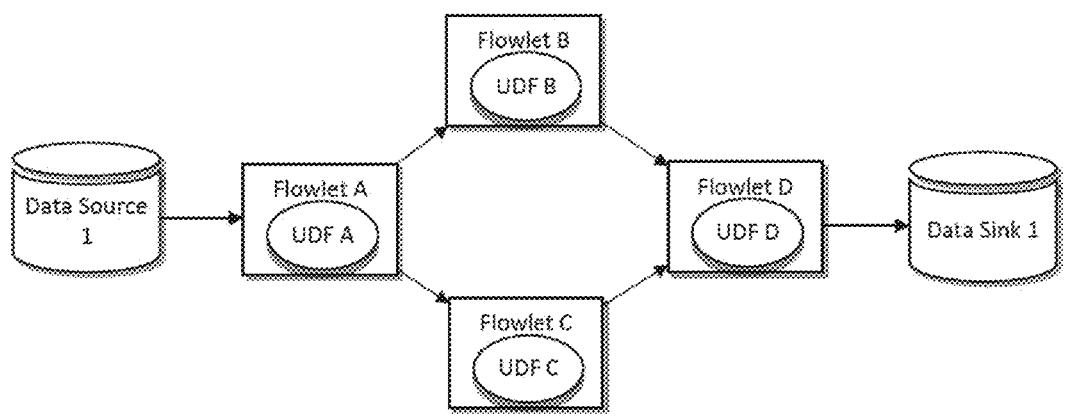
FIG. 1 shows a non-limiting example of a workflow.

As noted above, a "workflow" is a high-level construct that may be used in various aspects of the present techniques. A workflow is defined as containing one or more data sources, one or more flowlets, and one or more data sinks, where these components may be organized according to a directed acyclic graph (DAG). A flowlet may receive data, process it through some user-defined function, and output result data. Data may be received from or sent to another flowlet or from or to some external device, such as, but not limited to, a database, file system, or socket. A workflow may execute on a distributed computing system. FIG. 1 shows a non-limiting example of a workflow, in which data flows from data source 1 through various flowlets (according to various paths) to data sink 1. The various flowlets are shown containing various UDFs. A flowlet is not necessarily limited to containing a single UDF, nor is it limited to having a single data source or data sink. Similarly, a workflow is not limited to having a single data source and/or a single data sink.

Figure 2:
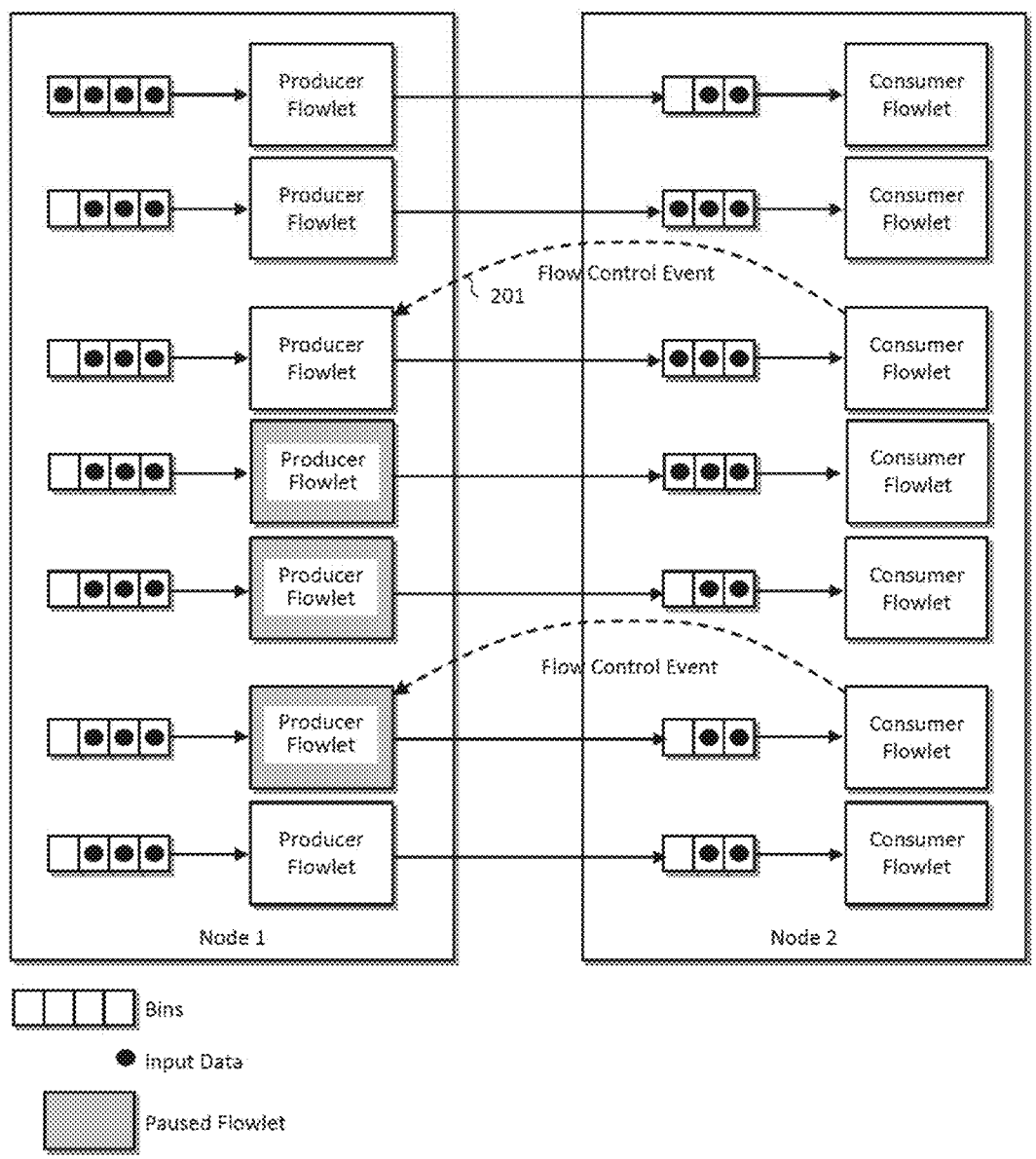
FIG. 2 shows a non-limiting example of a flow control sequence.

Regarding flowlets, a flowlet is a dataflow actor in a workflow that is designed to perform a computation on an input data set and to produce one or more output data sets. As shown in FIG. 2, a flowlet may be subject to a form of "flow control" or "throttling." As shown in FIG. 2, a producer flowlet may process data and send output data to a bin or queue associated with a consumer flowlet. Should the consumer flowlet (or, generally speaking, some downstream actor) have no space to store incoming data or, for some other reason, is overloaded (such as, but not limited to, having too many tasks to perform, e.g., in a work queue), the consumer flowlet (or downstream actor) may generate a flow control event 201, which may be processed by the system and may result in the producer flowlet being instructed to stop producing more output data. This may be for a set period of time or until a new flow control event indicates that the producer flowlet may again produce output data. In a variation, a flow control event may be used to cause a producer flowlet to output data at a lower rate (throttling down) until the consumer flowlet is again capable of receiving further data, at which time a further flow control event may be used to cause the producer flowlet to resume processing and outputting data at the previous rate ("throttling up").

In alternative implementations, flow control may take other forms. For example, a producer flowlet and/or a consumer flowlet may communicate when there is data ready to transfer or when data is needed, respectively, and data may be transferred from the producer to the consumer based on such requests. Window-based flow control may be used, as a further alternative. In another example of flow control, a flowlet instance may, if it becomes overloaded, may inform upstream input sources to that flowlet to stop or throttle reading data; this may apply not only to a directly upstream data source (e.g., a producer flowlet whose data is consumed by the flowlet instance) but may also apply to indirect upstream data sources (e.g., flowlets whose data is used, again, either directly or indirectly, but a producer flowlet whose data is consumed by the flowlet instance). In general, flow control is not necessarily limited to any of these schemes but rather may also incorporate other flow control algorithms known in the art.

In cases in which a producer flowlet is stopped/paused, an interruption occurs in the processing of data. Various types of interruptions may occur, based on various factors. In particular, interruptions may include active return (e.g., the function that the programmer uses to output data returns an error code that require the programmer to program in the system how to handle and then relinquish control to the system) or passive return (e.g., an exception is thrown to relinquish control back to the system, or the stack is switched by the runtime system or the operating system; note that "runtime" or "runtime system" may refer to a particular compute node or set of compute nodes or the entire system, which may be implementation-dependent). In either case, one may generally need to preserve the internal state of the user defined function such that the function can continue when it is resumed by the system. One way to maintain such state consistency may use stack switching (e.g., by the runtime system as user-level threads or by the operating system as heavyweight threads). Another way may be to use object-oriented programming; such techniques may constrain the programmer to store the state of the UDF in the properties of an object subclassed from the flowlet object provided by the system. This, however, may save memory space because stack switching may require a significantly-sized stack (i.e., greater than 1 MB), whereas the state the user needs to store may typically be much smaller, often on the order of 10-100 bytes. Another technique may provide a pointer that the UDF can use to allocate space and store any internal state. This third method may be used, e.g., for programming languages that may not readily support object-oriented programming, such as C or FORTRAN. A further technique may allow the programmer to choose from multiple techniques for the best mode in a particular use case.

Figure 3:
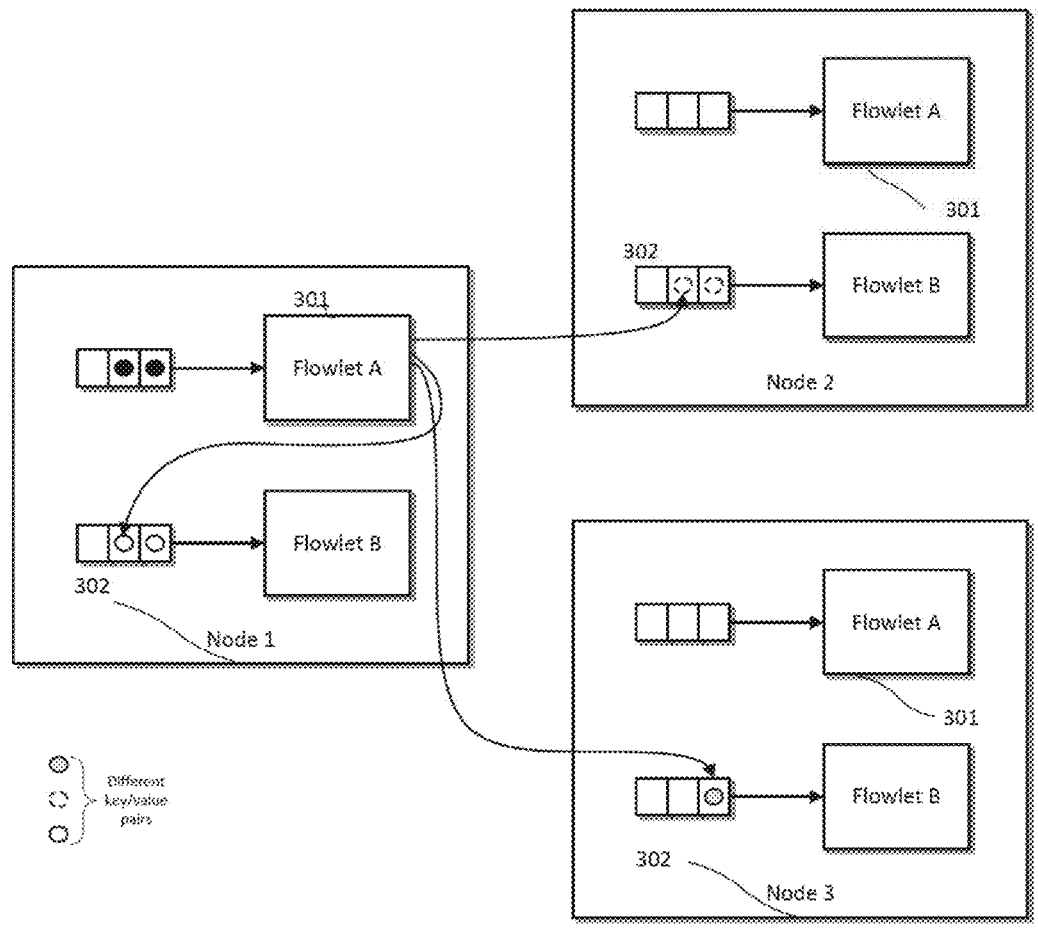
FIG. 3 shows an example of multiple instantiations of and interactions between flowlets.

Referring now to FIG. 3, a given flowlet may be instantiated 301 as one or more flowlet instances at runtime on one or more compute nodes (i.e., compute elements that do not share addressable memory without communicating over a network interface such as Ethernet, infiniband, NUMALink, etc). Flowlet instances may work together to advance the progress of a distributed flowlet. Computation may be partitioned among the various flowlet instances to balance workload across a set of compute nodes 302. The computation partitioning may use associated data partitioning. Data can be partitioned using a concept of "key/value pairs," with "keys" as routes and "values" as payloads. All key/value pairs with the same key may be routed to the same compute node. There may be various reasons for annotating multiple values with the same key, including (but not limited to): the work simply needs to be distributed across the machines and has no data input aggregation requirements; the downstream flowlet needs all of the values aggregated and presented at once for processing; the downstream flowlet has internal read-only information local to a specific compute node; or the downstream flowlet has internal read-write information local to a specific compute node that must be updated atomically.

For example, consider a canonical reducer found in the MapReduce paradigm referred to above. An issue in this paradigm is that the canonical reducer may generally require all key/value pairs (to use the terminology of this disclosure) to be emitted by prior mappers before any reduction can occur. As a result, a given reducer may not begin until the slowest mapper from which it receives data has completed; this may result in a load imbalance. Additionally, this may necessitate the storage of large amounts of data to disk because it cannot fit in more easily accessible memory, thus potentially resulting in a multitude of disk accesses that may further slow the processing.

Figure 4:
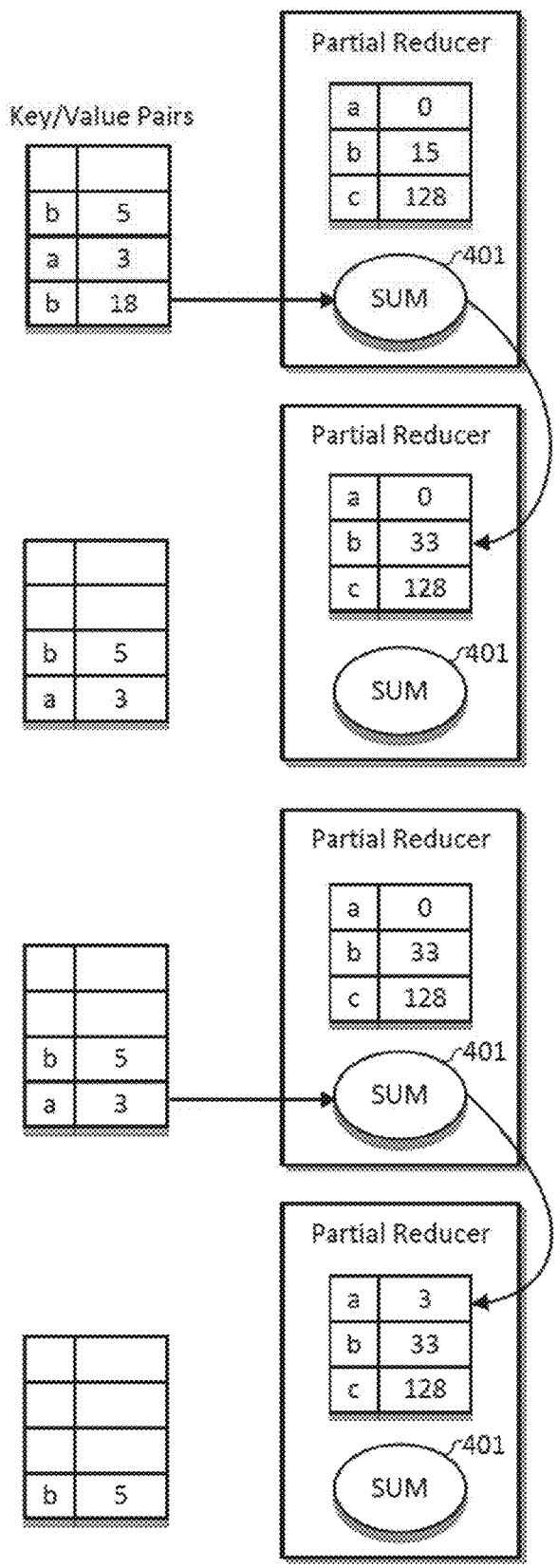
FIG. 4 shows an example of a reducing operation implemented using various techniques according to the present disclosure.

Turning now to FIG. 4, the key/value mapping described above, where the downstream flowlet has internal read-write information local to a specific compute node that must be updated atomically, may provide a solution to both of these problems. If the reduction can be done one value at a time, then a flowlet may create an internal memory store (which may be addressable by key) that may contain the partial reduction of the values. For example, if the reducer's task is to sum all of the values for a key and emit the key/value pair, <key,sum of values>, then an internal memory store could be initialized to zero, and when a key value pair arrives at the flowlet, the flowlet may atomically add the value to the internal store's current value creating a partial sum 401, as reflected in FIG. 4. When all of the key/value pairs from the upstream flowlet have been produced, the final sum may be emitted as <key, final sum>. This partially reducing flowlet may improve the synchronization before computation problem by allowing asynchronous partial computation before the upstream flowlet is complete; may aid in addressing the large intermediate data problem; and may mitigate the need to store intermediate data to disk by consuming the key/value pairs as they are created and only storing the partial sums.

Figure 5:
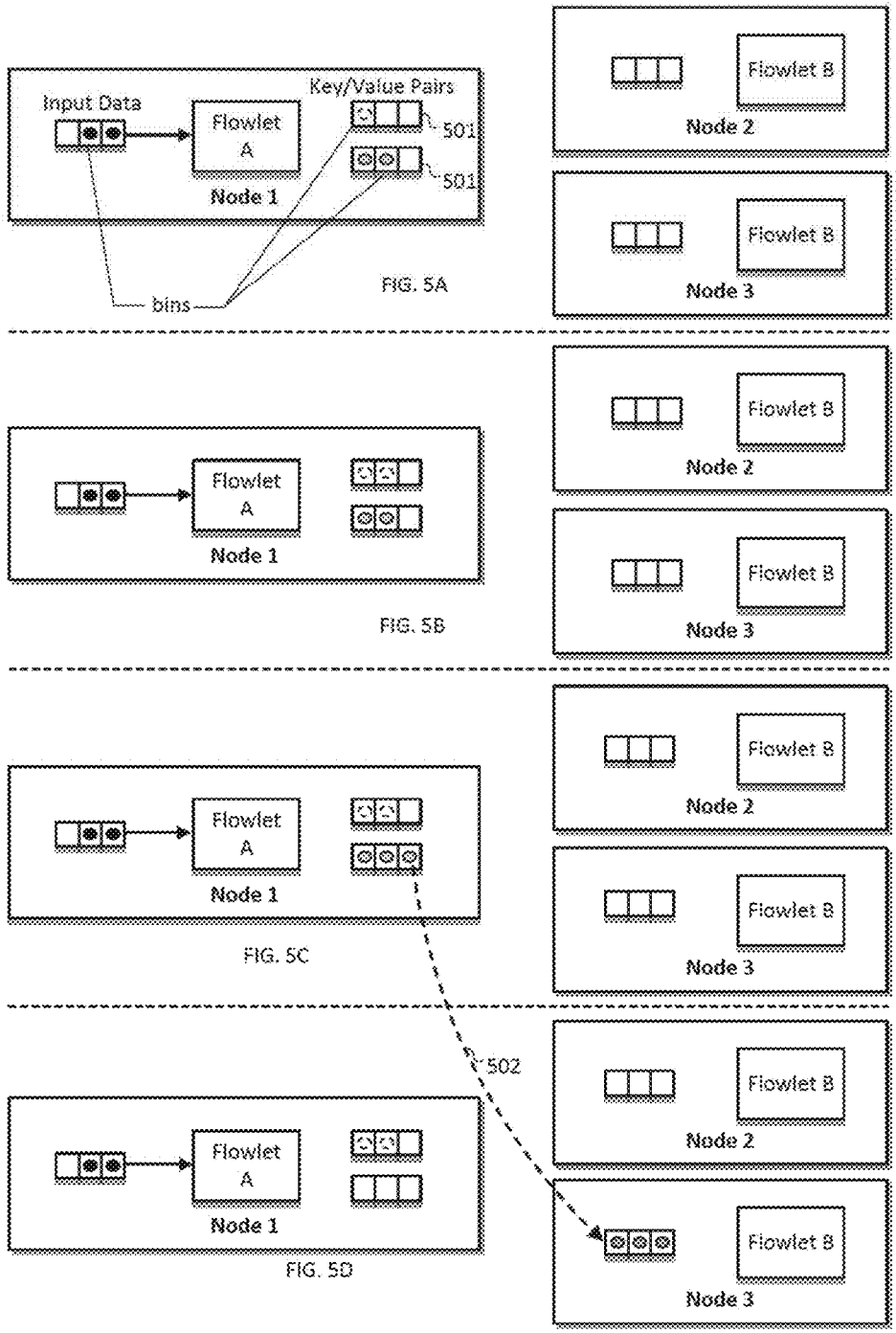
FIGS. 5A-5D show an example of a work aggregation sequence.
Figure 6:
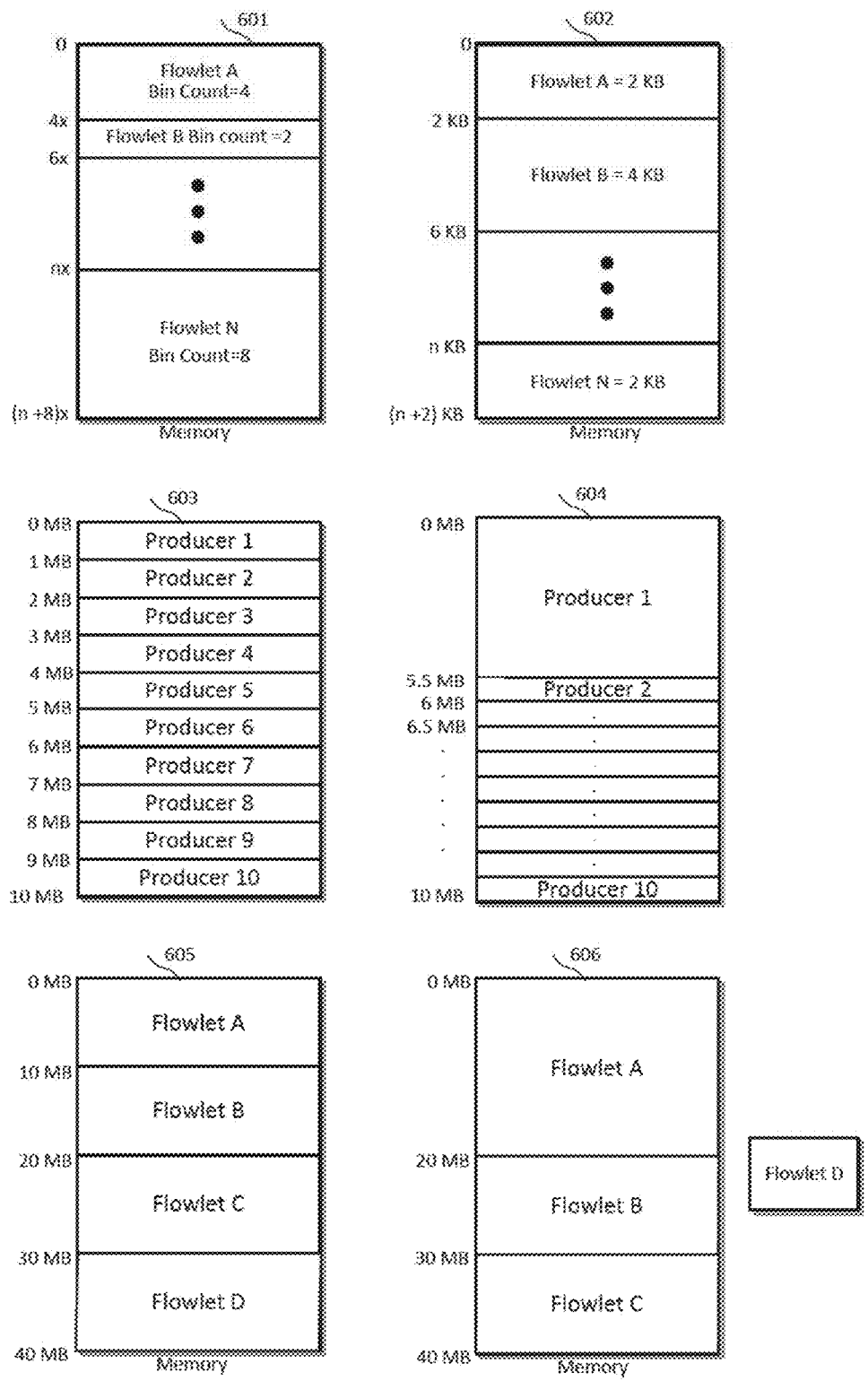
FIG. 6 shows various examples of memory allocations.

FIG. 5, consisting of FIGS. 5A-5D, shows an example of a work aggregation sequence. Key/value pairs may be any size. In many use cases, both the key and the value may be small. There may generally be fixed overheads for processing a batch of key/value pairs, regardless of the sizes of the individual pairs. Some examples of such overhead may include network overhead in processing, data header size per message sent/received, overhead in obtaining a group of key/value pairs from the runtime system's work queue, and overhead in checkpointing state between a batch of key/value pairs. One may reduce processing overhead by aggregating multiple key/value pairs into a single batch, in which the key/value pairs may be stored together and may be processed as a batch. In the technique as shown in FIG. 6, flowlets may mitigate the overhead issues by aggregating key/value pairs into bins 501. Bins 501 may accumulate one or more key/value pairs before the bin is forwarded to the next flowlet, as indicated by arrow 502. The size of the bin 501 may thus determine an amount of work forwarded to the next flowlet 502 or to a data sink (see, e.g., FIG. 1). Similarly, the bin size may determine an amount of work that can be received from an upstream flowlet or source (i.e., for a bin in which input data may be stored). In one possible implementation, the user may define the sizes of the bins. In another implementation, the runtime system may determine bin sizes based on observation of dynamic run-time parameters, such as remaining work in the system, a flowlet's position in the workflow, the priority of the producer flowlet with respect to the consumer flowlet, or other factors that may affect performance with respect to bin size. In general, larger bins amortize fixed overheads over more key/value pairs, but may limit concurrency. In one implementation, if a single key/value pair is larger than the bin size, it may be sent in a single "oversized" bin. In another implementation, such a key/value pair may be fragmented into multiple bins and reassembled at the consumer flowlet.

As discussed above and shown in FIG. 2, flow control may be used in conjunction with processing based on workflows/flowlets. As discussed above, if a flowlet does not have space to store incoming input data, it may send a flow control event 201 to the upstream flowlet that may indicate that the preceding producer flowlets should, e.g., (temporarily) halt data output. Each compute node may have a specific amount of memory allocated to receiving incoming data for future processing. Some implementations may have a static maximum amount of space, while other implementations may grow and shrink the space throughout the course of the program due to other memory constraints (such as, but not limited to, a case in which, if one portion of the execution requires a large lookup table that can be deleted after some initial period of execution, then more space can be allocated to the incoming data after deletion of the lookup table).

Available memory may be divided among local flowlet instances in various ways, as shown in FIG. 6. In one example 601, the amount of memory a flowlet can receive may be counted in terms of number of bins. In another example 602, the amount of space may be counted in bytes. Other units may be possible, as well, e.g., bits, words, etc., and the invention is not thus limited.

Some implementations 603 may partition the incoming data memory statically among producers (e.g., each compute node may have a flowlet instance that is a producer, and a 10 MB space could be divided evenly among 10 producers such that each has 1 MB of space). Other implementations 604 may partition incoming data memory dynamically among producers; for example, this may be done such that any producer can produce data as long as the entire space limit is not exceeded (e.g., at a given time, a 10 MB space could be used among 10 producers such that the first producer may use 5.5 MB and the other nine may use 0.5 MB). Further implementations 605 may partition the incoming data memory statically among flowlets running on a particular compute node (e.g., if there are four flowlets and 40 MB of total incoming data space, each flowlet may be allocated 10 MB). A further implementation may partition the incoming data memory dynamically among flowlets running on the compute node (e.g., if there are four flowlets and 40 MB of total incoming data space, at a given time, one flowlet may be allocated 20 MB, two others may be allocated 10 MB each, and the final flowlet may not be allocated any space, and this may be adjusted based on future circumstances).

Figure 7:
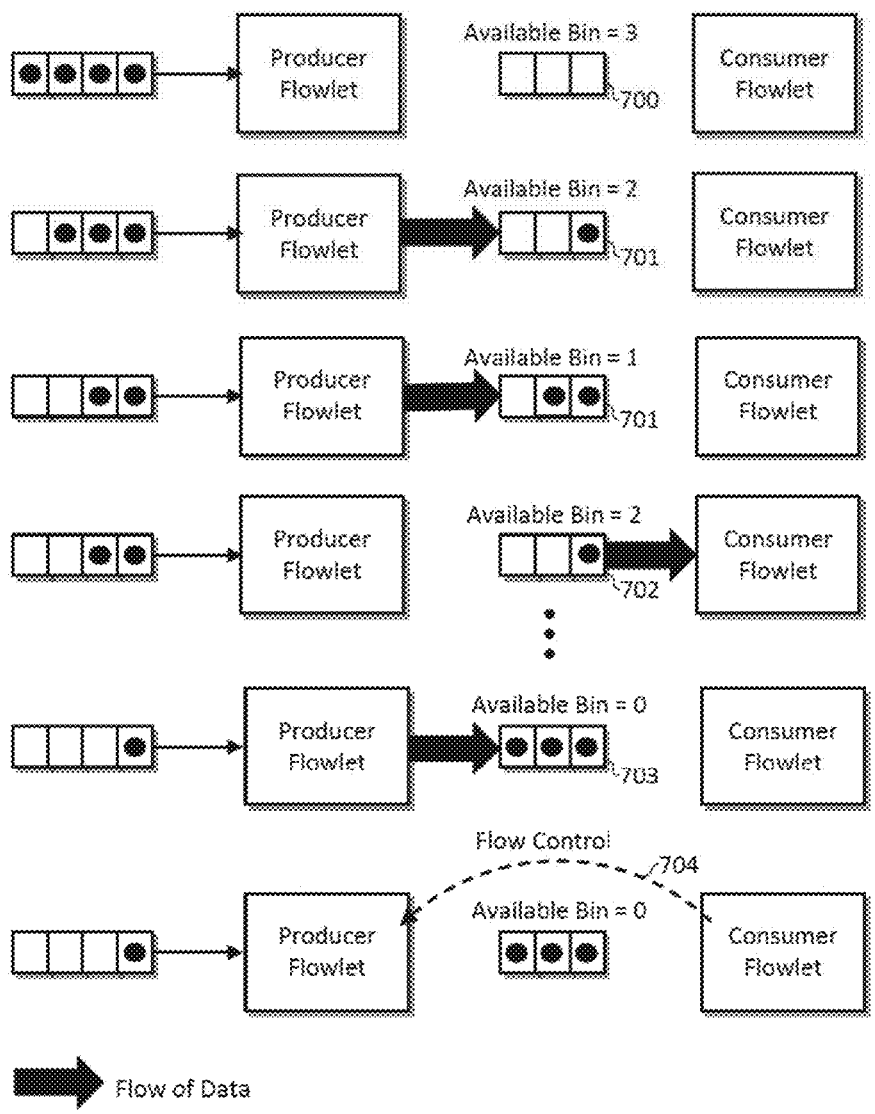
FIGS. 7A-7F show a further example of flow control.

FIG. 7, consisting of FIGS. 7A-7F, illustrates further aspects of how flow control may be implemented. One aspect of flow control may be that the producer should not produce more data if the consumer will not have any space to store it. Therefore, in some example implementations, the amount of reserved space may be communicated between the producer(s) and consumer(s) before the producer(s) begin producing data. For example, in FIG. 7A, the consumer flowlet may begin with an empty bin 700. As the producer produces data and emits it to the bin of a consumer 701, the producer may decrement its count of available space, as shown in FIGS. 7B and 7C, until the consumer acknowledges that it has consumed the data 702, as shown in FIG. 7D. If the count maintained by the producer reaches zero 703, as shown in FIG. 7E, the consumer may send a flow control event 704 (or, alternatively, the producer may trigger its own flow control event), as shown in FIG. 7F, which may cause the producer to be interrupted. In such a case, a worker thread on which the producer was executing may be released back to the system for other processing.

Figure 8:
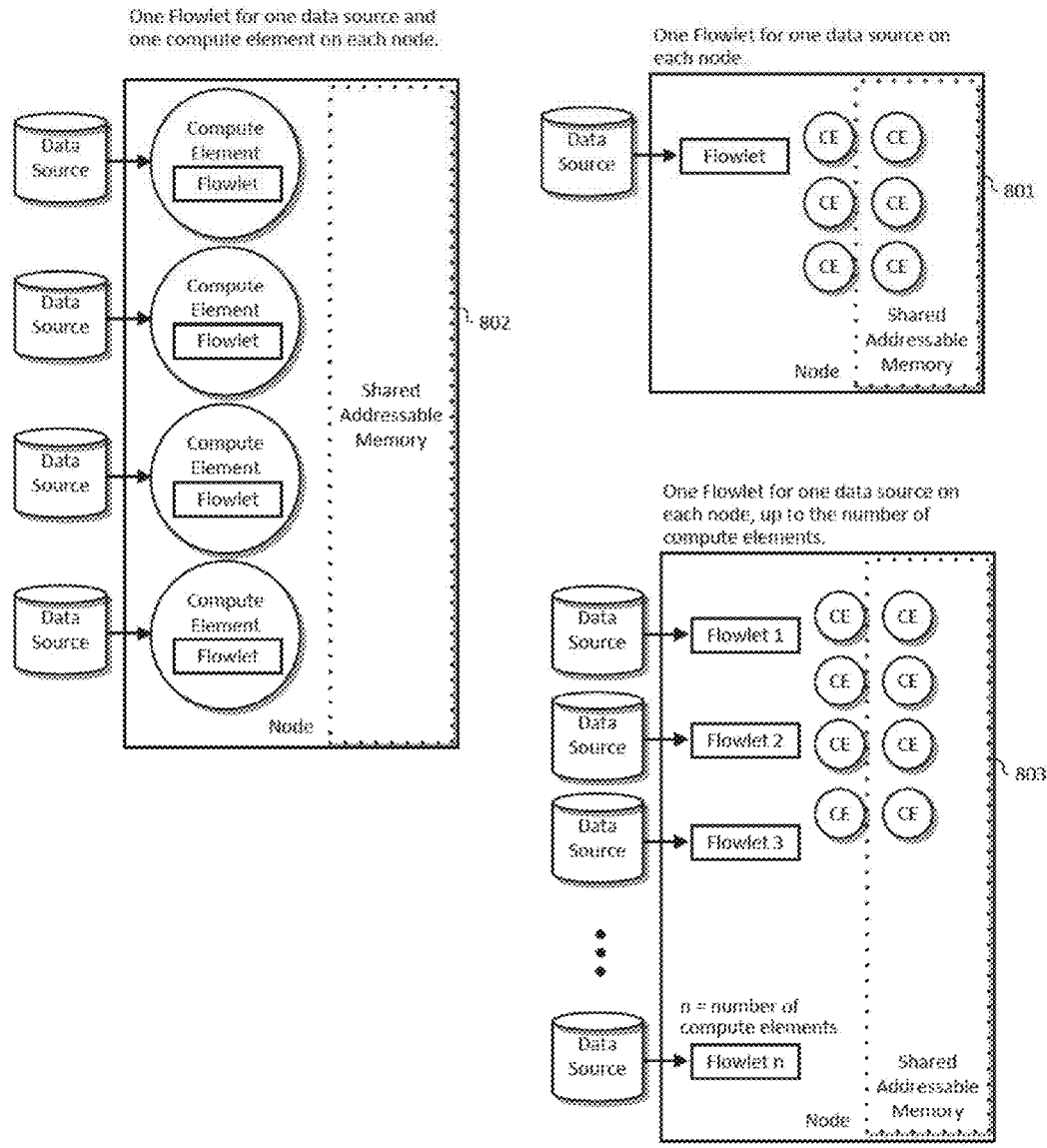
FIG. 8 shows an example of intra-node load balancing.

Within a single compute node, there may be a shared addressable memory and a number of compute elements that may easily and efficiently share data. At the beginning of a program, a number of flowlet instances may be started and may read from the workflow data sources. FIG. 8 shows three non-limiting examples of how this may be implemented. In one example 801, one flowlet instance may be started per compute node per data source. In another example 802, flowlet instances equal to the number of compute elements may be started per compute node per data source. In a third example 803, some number between one and the number of compute elements are started per compute node per data source. Often, there may be a data source-dependent number of optimal instances that balances contention with the data resource with concurrent processing.

Figure 9A:
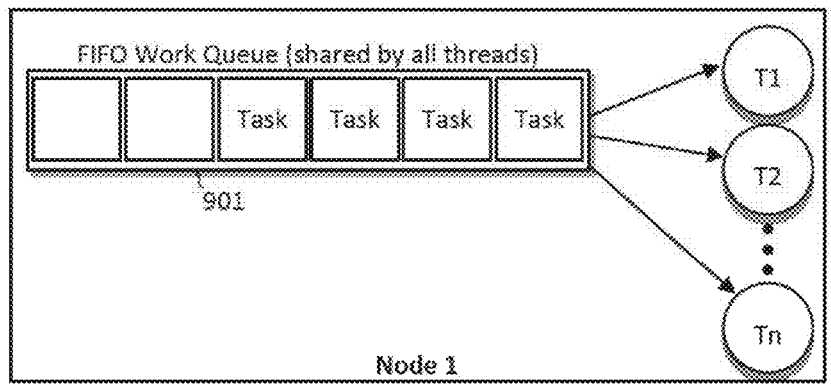
FIGS. 9A-9C show further examples of intra-node load balancing.
Figure 9B:
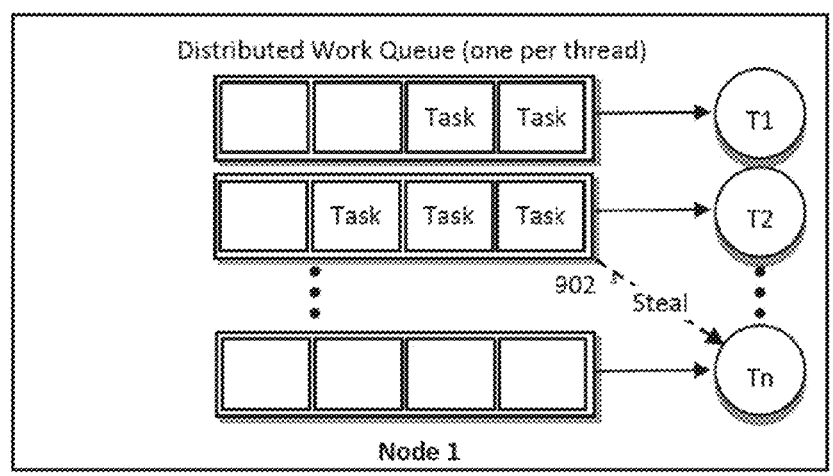
Figure 9C:
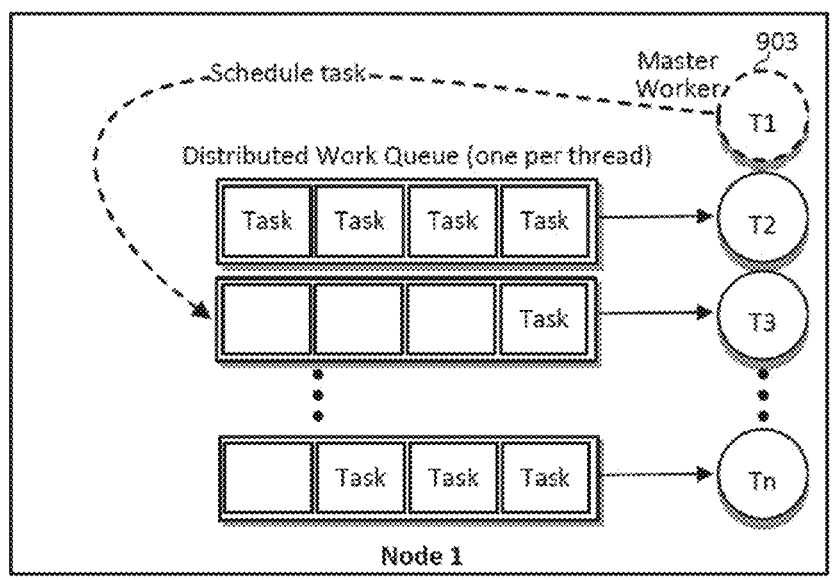

Turning now to FIG. 9, consisting of FIGS. 9A-9C, when a flowlet instance is started, it may be placed in a work queue 901 as a task. The runtime system may implement one or more worker threads (T1, T2, . . . , Tn) that may dequeue tasks from the work queue. In one example, the number of worker threads may be equal to the number of compute elements, in an attempt to maximally utilize all compute elements. In another example, the number of worker threads may be less than the number of compute elements (in one particular example, exactly one less), such that the compute elements can be effectively shared (by the operating system) among the particular program and other programs running concurrently on the system. In one example, the work queue 901 may be a simple first-in-first out queue shared by all of the worker threads, as shown in FIG. 9A. In another example, the work queue may be a series of distributed queues (e.g., one per worker thread), which may be arranged such that worker threads may pull from their associated queues locally and may "steal" tasks 902 from other queues when theirs are empty, as shown in FIG. 9B. In another example, as shown in FIG. 9C, the work may be loadbalanced by a master worker (thread) 903 that may examine each worker's incoming queue and may redistribute as warranted by circumstances.

A worker thread may obtain a task and may determine a type of flowlet associated with the task. The task may also contain one or more key/value pairs for the flowlet. For each key/value pair, the worker thread may execute the user defined function of the flowlet. Alternatively, if the flowlet requires, the worker thread may store the key/value pair for a later full aggregation of all values before processing. The user defined function of the flowlet may process the key/value pair, possibly creating an internal state stored in the flowlet instance, a key-indexed memory store, or a user-created heap object. During or after processing the key/value pair(s), the user defined function may emit zero, one, or more key/value pairs (a flowlet may change its internal state or a memory store state and not need to emit anything because future processing may cause the emission).

Figure 10A:
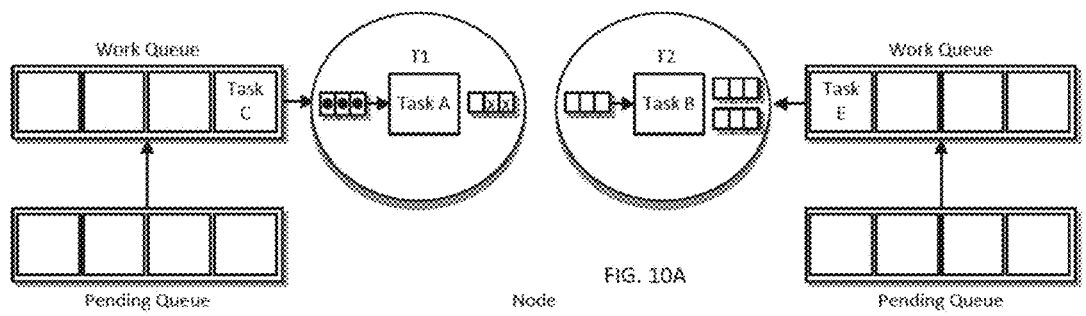
Figure 10B:
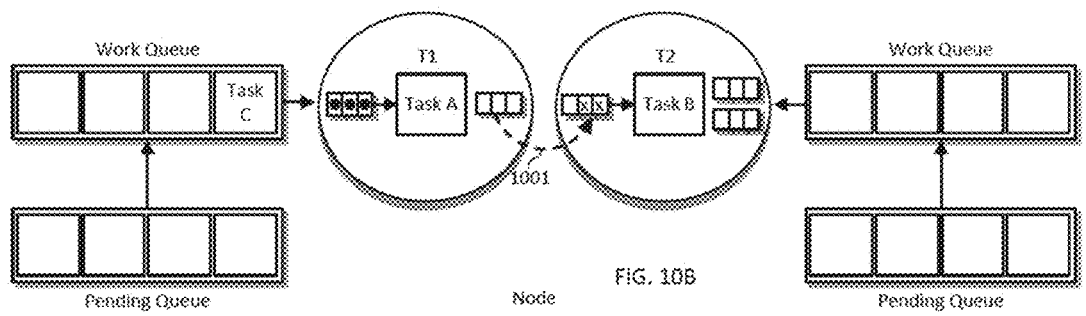

FIG. 10, consisting of FIGS. 10A-10H, shows examples of processing scenarios at a computing node. In FIG. 10A, worker thread T1 may execute Task A. In FIG. 10A, the input bin to T1 is shown as being full, and the output bin is shown as containing one empty location (the invention is not limited to a bin size of three, but this is used in the illustrations of FIG. 10 as an example). In FIG. 10B, if processing the next key/value pair will cause the currently aggregated key/values in a bin to exceed the bin size, the bin may be sent 1001 to the consumer, in this case, Task B running on worker thread T2 (after possible post-processing such as, but not limited to, sorting, combining, and/or filtering). In some cases, an output bin may be flushed before it is full, which may be based on an event, such as elapsed time, rate of input data to the flowlet, starvation of other flowlets on other compute nodes, etc. This may be useful, for example, in "real-time" systems where timely processing of sparse input data events may be more important than conserving overheads of processing many events. If aggregation is not used, every key/value pair may trigger a send.

Figure 10C:
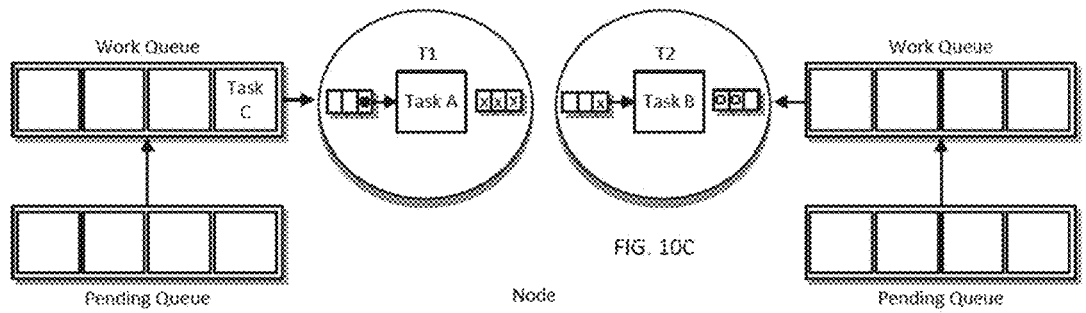
Figure 10G:
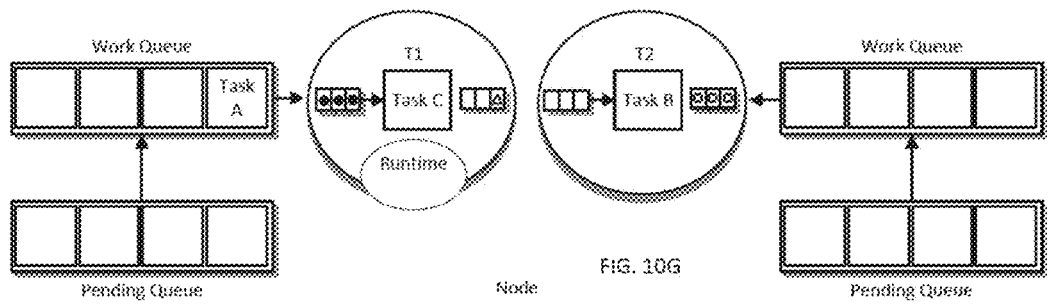
Figure 10H:
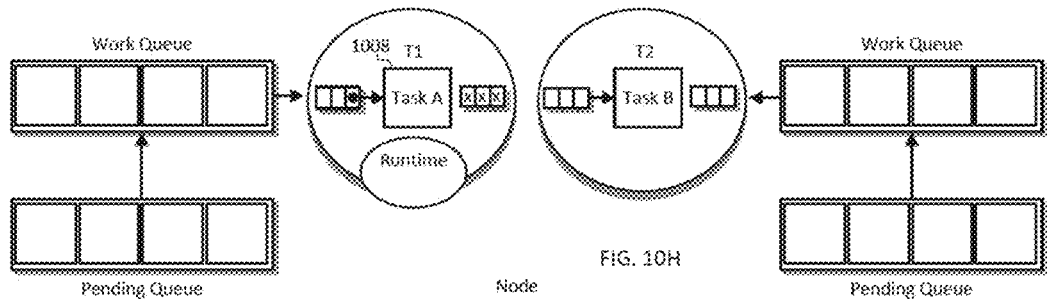

In FIG. 10C, the output bin of T1 is full, and there remains data still to be processed in T1's input bin. However, T2's input bin still contains one entry (and T2's output bin contains two entries. In this case, if data is being aggregated at T1's output bin, the aggregated data would be too large for T2's input bin. If, at any time, the emitted key/value pair will exceed the amount of space allocated on the consumer, the producer flowlet instance may be interrupted 1002, as shown in FIG. 10D. As shown in FIG. 10E, the producer flowlet may then be placed on a "pending" queue 1003. The worker thread, in this case, T1, may then obtain another task from the work queue and execute that task 1004. As shown in the example of FIGS. 10E-10F, this other task may be Task C. When the consumer (at T2, in the example of FIG. 10) finally processes a batch of key/value pairs from the producer 1005, the consumer may then alert the runtime system on the producer's compute node that more space is available 1006. That runtime system may then move the "pending" task (in this example, Task A) to the work queue 1007, as noted in FIGS. 10E-10G. When a worker thread finishes a current task (e.g., Task C), it may return to the work queue to resume computation on the pending task (e.g., Task A) 1008, as shown in FIG. 10H. The pending task may "remember" where it left off and may obtain any internal state from the stack, its object properties, or a user allocated heap space, in order to do so.

Figure 11A:
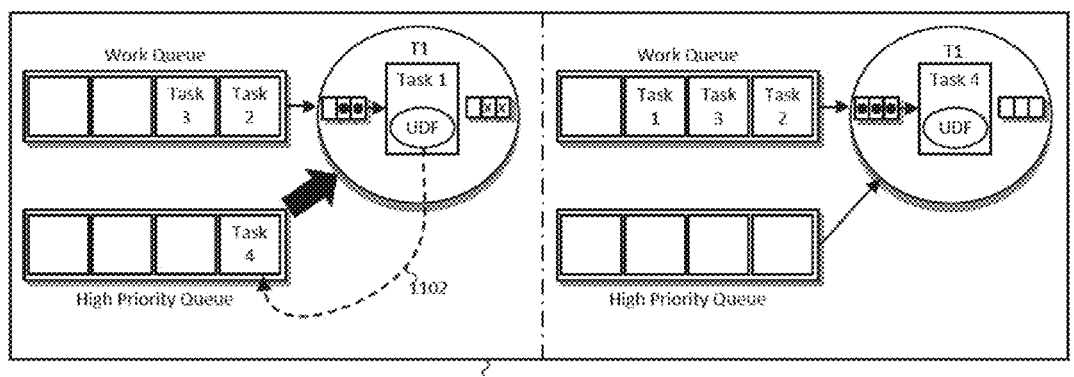
FIGS. 11A and 11B show an example of a system implementing prioritized tasks.
Figure 11B:
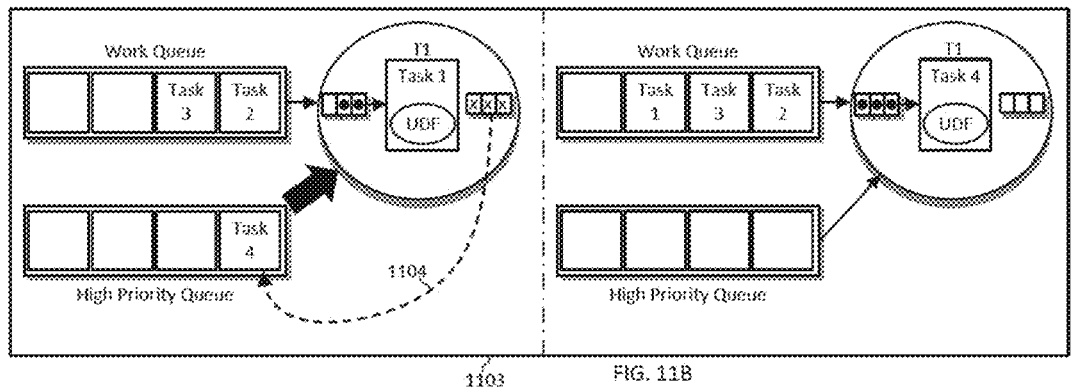

In addition to the above, in some example implementations, tasks may be prioritized, and it may be necessary to interrupt a low priority task such that a compute element is made available to process a high priority task. This is reflected in the examples shown in FIGS. 11A-11B. As shown, respectively, in FIGS. 11A and 11B, such an interrupt may occur at the input key/value pair granularity or the output key/value pair granularity. For example, a worker thread T1 may be executing Task 1 when a new, high-priority task, Task 4, arrives 1101. At the input key/value pair granularity, as reflected in FIG. 10A, the worker thread may make decisions 1102 between invocations of the user defined function; Task 4 may preempt Task 1, and Task 1 may be placed on the regular work queue. At the output key/value pair granularity, as reflected in FIG. 10B, the worker thread initially executing Task 1 1103 can be interrupted by mechanisms similar to those used for flow control, and again, Task 4 may preempt Task 1, and Task 1 may be placed on the regular work queue.

Some use cases may require in-memory stores of data that are larger than the main memory of any individual compute node. This data may often be used as a reference throughout a workflow. One way to address this may be to distribute reference data across non-shared memory spaces in many ways, such as, but not limited to, partitioned global address space (PGAS) (as used in Unified Parallel C, SHMEM, Global Arrays, etc), a distributed hash table (DHT) (as used in Amazon Dynamo, Apache Cassandra, Apache Accumulo, and Terracotta, etc), or a horizontally or vertically partitioned database (as used in NoSQL databases, Oracle, EMC GreenPlum, etc). However, all of these mechanisms require that the user request the data (mostly remotely) and bring the data back to the local compute element for processing. This may, in many cases, require the requester to largely wait for the response before computation can continue.

Figure 12:
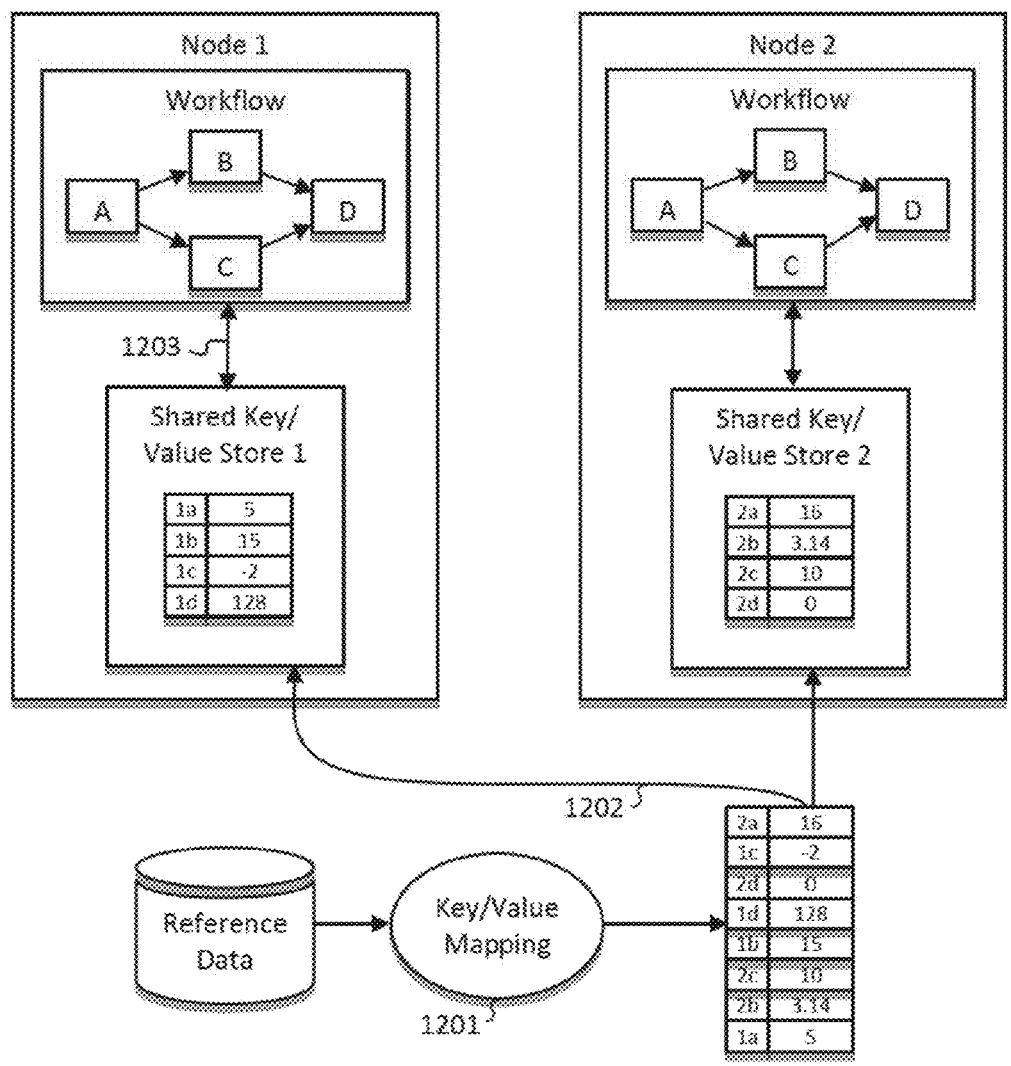
FIG. 12 shows an example of shared key/value storage.

As an alternative, according to various implementations of the present techniques, the computation may, instead, be brought to the data. This may be done by means of shared key/value stores, an example of which is shown in FIG. 12. The key may define where the data is localized (e.g., an array element in the PGAS model, a hashtable key in the DHT model, or a table row or column index in the case of a partitioned database). In the example shown in FIG. 12, a user may define a key/value pair mapping 1201 for the reference data. The reference key/value pairs may be partitioned among, and distributed to, the system's compute nodes 1202. (1203) Once the reference key/value pairs exist in the local memory of the distributed system, the shared key/value store may be available to all flowlets within the workflow that share a comparable key partition scheme, as indicated by 1203. By sending the computation to the local data, it may be possible to continue with other computation.

A shared key/value data store, e.g., as used in the example of FIG. 12, may be a write-once data store 1301, in which the value of a key is read-only, once a key/value pair is entered, and writing two key/value pairs with the same key is forbidden. This is illustrated in FIG. 13A. Alternatively or additionally, a key/value data store may be implemented as a write-many data store 1302, as shown in FIG. 13B, in which the value of the key can be appended to or modified after a key/value pair is entered. The write-once mode, where it is applicable, may be more amenable to resilience because it can be checkpointed in bulk at regular intervals. The write-many mode may, however, be more generally applicable, but it may be associated with a high cost of resilience because it may need to be checkpointed often, and modifications between checkpoints may need to be treated as atomic to the rest of the system.

Figure 14A:
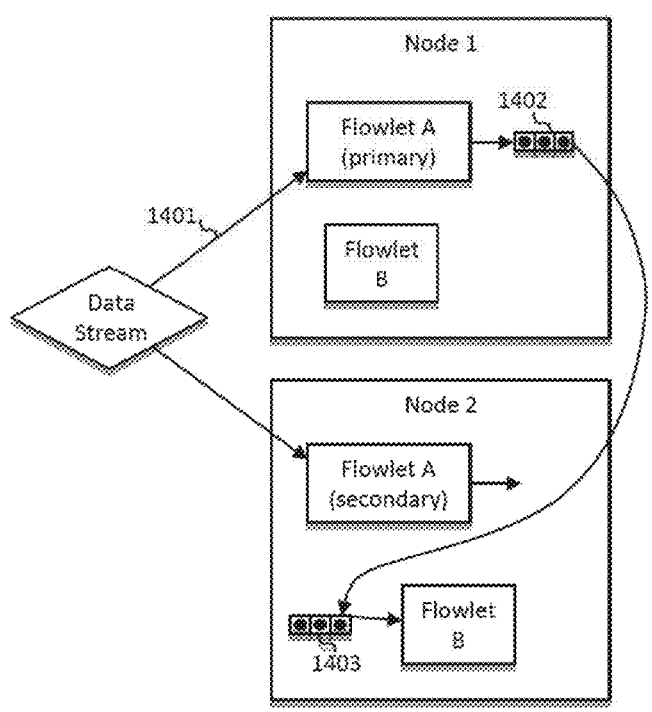
FIGS. 14A and 14B show an example of a fault tolerance mechanism that may be used in conjunction with various implementations of the techniques described herein.
Figure 14B:
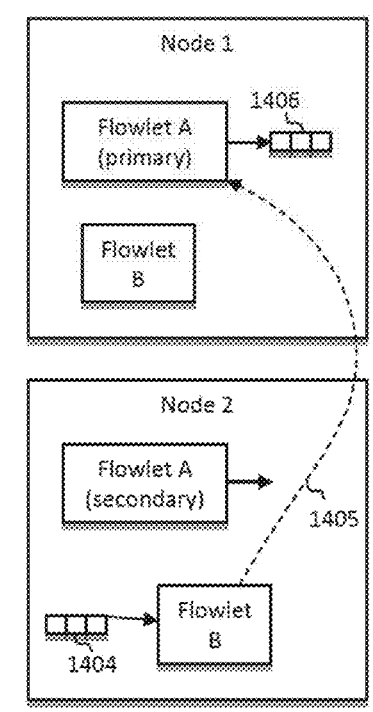

A distributed fault tolerance mechanism may be employed to operate through node failures during the execution of a workflow. Fault tolerance may be achieved through a combination of fine-grained checkpointing and work duplication. An example of a fault tolerance mechanism is shown in FIGS. 14A-14B. In the present example, as shown in FIG. 14A, when reading data from a source that cannot be easily recreated, such as a data stream 1401, the data may be duplicated on primary and secondary compute nodes (Node 1 and Node 2, respectively, in this example). In FIG. 14A, Flowlet A, which may consume the data from data stream 1401, may be instantiated on both compute nodes, i.e., there may be a primary instantiation of Flowlet A and a secondary instantiation of Flowlet A. In the example shown in FIG. 14A, a second flowlet, Flowlet B, may consume output from Flowlet A, and may also be instantiated on both Node 1 and Node 2. In this example, the instantiation of Flowlet B on Node 2 may consume data output by Flowlet A on Node 1 (the invention is not thus limited, however). Resilience between stateless flowlets (such as readers, mappers, reducers, and writers) may be maintained by duplicating the key/value pairs (which may be aggregated in bins) on both the producer 1402 and consumer 1403 sides until the data is processed by the consumer and can safely be discarded. When the producing flowlet sends data to the consuming flowlet, it may retain a copy locally. The consumer may also retain a copy of the data in its storage area for receiving incoming data. As shown in FIG. 14B, when the consumer flowlet instance consumes the key/value pair batch, it may notify 1405 the producer that the key/value pair batch is complete, and the producer may then be permitted to destroy the duplicate data 1406.

Figure 15:
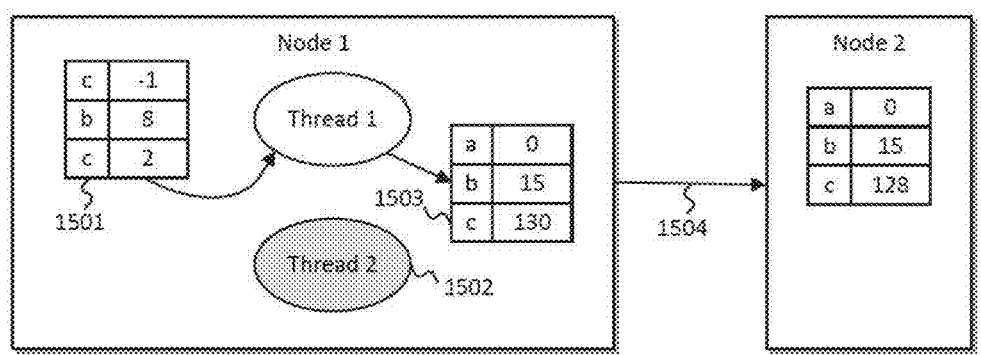
FIG. 15 shows a further example using state retention.

For flowlets that retain state (e.g., a partial reducer), that state may need to be checkpointed on other nodes. FIG. 15 shows an example of how this may be implemented. Assume an initial condition in which all state data is replicated on another node, such as, but not limited to, the initial condition where there is no state data. A batch of one or more key/value pairs may arrive for processing 1501 at Node 1. A state store 1503 may be locked such that only a single worker thread, e.g., Thread 1, may be able access the store for processing this batch of key/value pairs; that is, another worker thread, e.g., Thread 2, may be prevented 1502 from accessing the store. The worker thread that processes the data (Thread 1 in the example of FIG. 15) may modify the state store accordingly 1503. Upon completion of the processing of one or more of the key/value pairs (or interruption due to flow control or higher priority tasks), the modified state may be sent 1504 to another node (e.g, Node 2) as a duplicate checkpointed copy, and the state store may then be unlocked. In this manner, if Node 1 fails, the state can be recreated from before the key/value pair batch was processed, and the key/value pair batch can be recovered from the producer flowlet compute node. Note that although the state store for a particular flowlet may be locked such that instances of the particular flowlet may not use it, other flowlets may access other state stores concurrently.

A frequency with which the modified state may be sent to the other node may be determined by the programmer or system operator, and this may affect the granularity of the recovery from faults/interruptions. If this occurs after the processing of each key/value pair, then processing may resume at a key/value pair following the last processed key/value pair. If such redundant storage occurs less frequently, recovery may only be able to commence from the point following the last key/value pair, or group of key/value pairs, processed prior to the sending of the modified state to the other node.

For data stores that span flowlets (such as, but not limited to, shared key/value stores described above), the state may be replicated in a similar manner as above for single flowlet state stores. However, only one flowlet may modify the store at a time. For write-once stores, the readers may access the store concurrently without conflict once the data is written.

With the above approach, any single node failure may be recovered from the duplicate data (note that once recovery from a particular single-node failure is achieved, single-node failure recovery may again be possible). One implementation of this fault tolerance plan may replicate the data on another compute node in the case where the producer and consumer flowlets are on the same compute node.

Other implementations may replicate the input/output data of flowlets on more than just the producer and consumer flowlets' compute nodes. With input/output data only replicated on the producer and consumer compute nodes, the system may be resilient to exactly one compute node failure between failure and recovery. If a second node fails before the first node can be recovered, the data held by the producers and consumers shared between the nodes may be lost. Therefore, replicating the data on N more nodes may permit N+1 failures to occur simultaneously before total failure of a program. This represents a tradeoff between replication space and time overhead and the need to recover from a number of simultaneous failures, which is a function of the unlikeliness of that failure mode.

The determination of how many failures may need to be accounted for/how much replication of data/states is needed may be a matter of user/programmer judgment, which may be based, e.g., on the sensitivity of the program, the mean time between failures of any individual node, number of nodes in the system, required system up-time, and/or other factors. In some scenarios, minimum fault tolerance may be sufficient, while in other scenarios, it may be critical to ensure, to a high degree, that the program execution does not fail. Various implementations of these techniques may permit the programmer to indicate and/or implement a degree of fault tolerance appropriate to a given program.

Some applications/algorithms, e.g., when implemented using a Map/Reduce programming model (but not necessarily limited thereto), may have synchronization points (or "barriers") within a workflow where one stage cannot begin until another stage is completely finished processing. In the flowlet-based system, a KeyValueStore (KVS) flowlet may be introduced to implement such a barrier. The KVS flowlet may generally be synchronous. At a KVS flowlet, an entire intermediate state of a workflow at a particular point in time may be stored, which may permit checkpointing.

To understand the use of KVS flowlets for checkpointing, one may note that, particularly in applications that involve large amounts of data/states and/or are computationally intensive, one may wish to minimize the amount of repeated work performed if the workflow implementing the application fails. However, simply halting a workflow at any given point may be impractical because, for example: (a) at any given point in time, there may be an enormous amount of context that would need to be saved to retain a complete "snapshot" of the job in progress; and (b) even if one were able to capture all state information, depending upon how fine-grained of a context is captured, there is no guarantee that the same context could be reached by replaying and "fast-forwarding" the workflow, due to non-deterministic task scheduling, producing key/value pairs, buffering based on available memory, etc. KVS checkpointing may address such issues. A synchronous KVS flowlet may be used to provide a barrier between operations that push key/value data into a store and operations that push key/value data out of the store. Therefore, with the use of such a KVS flowlet, the downstream flowlet(s) that push data out of the store may be prevented from doing so until flowlets upstream of the KVS flowlet have completed their transactions with the store.

On a practical level, the KVS flowlet may receive a notification that all upstream transactions have been completed, to guarantee that all data from upstream flowlets has been received. Thus, a KVS flowlet implemented at some intermediate point in a workflow (e.g., but not limited to, intermediate data storage in a non-iterative workflow or results at the end of each iteration in an iterative workflow) may provide a "free" opportunity to checkpoint the workflow ("free," in the sense that, upon upstream completion, none of the downstream flowlets are producing key/value pairs, and the KVS flowlet has sent nothing upstream, meaning that no additional control (or performance overhead) may be needed to pause the workflow; obviously, there is the cost of writing the key/value store data to memory, as will be discussed further below). If all of the data produced by upstream data producers is aggregated into a single downstream KVS flowlet, then the KVS flowlet may be used as a checkpoint, meaning that upon job restart following a failure downstream from the KVS flowlet (or in a further iteration of an iterative workflow), the upstream data producers do not need to run at all (or the previous iteration(s) need not be run at all); in essence, the key/value store created by the KVS flowlet may replace the entire upstream graph (or all prior iteration(s)) and be considered as an entry flowlet for the restart.

To understand the use of a KVS flowlet, it is helpful to understand some aspects of graph theory. In particular, "in control flow graphs, a node d dominates a node n if every path from the entry node to n must go through d." "Dominator (graph theory)," Wikipedia, the free encyclopedia (en.wikipedia.org/wiki/Dominator_(graph_theory). Therefore, to the degree that a KVS flowlet dominates upstream producers, those upstream producers may essentially be disabled during a restart after a failure, and their results, as stored by the KVS flowlet, may be "fast-forwarded" to the point in time at which the workflow failure occurred. Any producers not dominated by a KVS may need to reproduce some or all of their data (and it is noted that, in multi-branched applications there may be different KVS flowlets that dominate different subsets of upstream producers, so fast-forwarding may be possible to different degrees for different branches of workflow).

Figure 16:
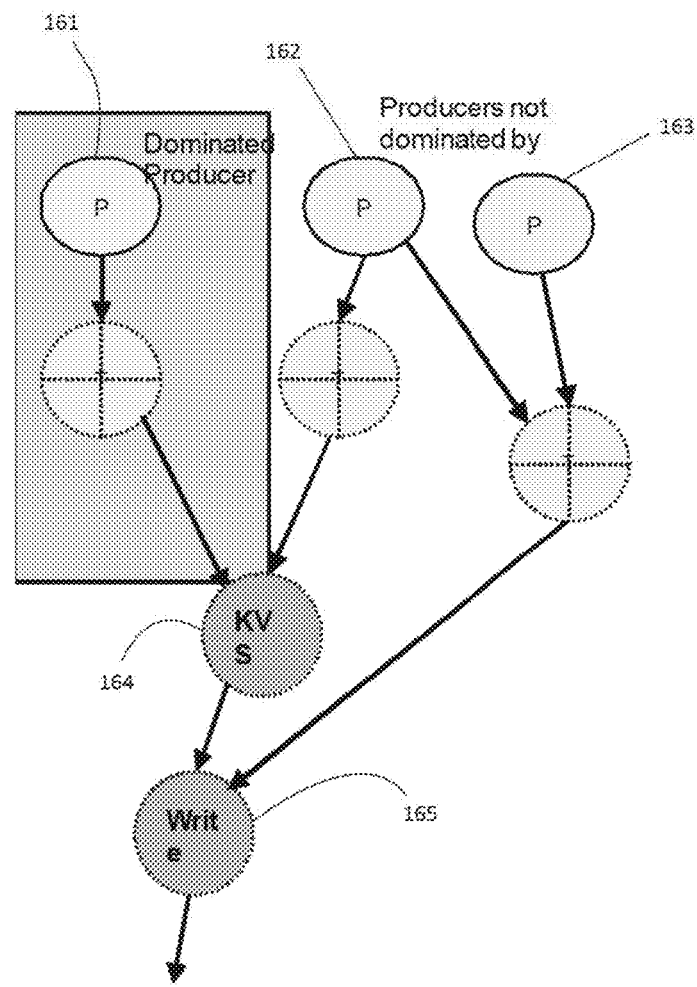
FIG. 16 shows an example of a conceptual system according to various implementations of techniques described herein.

FIG. 16 illustrates an example of a workflow with a KVS flowlet inserted. In FIG. 16, KVS flowlet 167 may dominate producer 161, via node 164, because the only way for data from the branch 164/161 to reach the write flowlet 168 is via KVS flowlet 167. However, producers 162 and 163 are not dominated by KVS flowlet 167 because each is shown with a path (162/166 and 163/166) that bypasses KVS flowlet 167 (even though producer 162 also has a path, 162/165, that goes through KVS flowlet 167, data is not prevented from bypassing KVS flowlet 167). As a result, upon a failure downstream from KVS flowlet 167, producer 161 may not need to reproduce its results, but producers 162 and 163 may need to run, to reproduce their results.

Figure 17A:
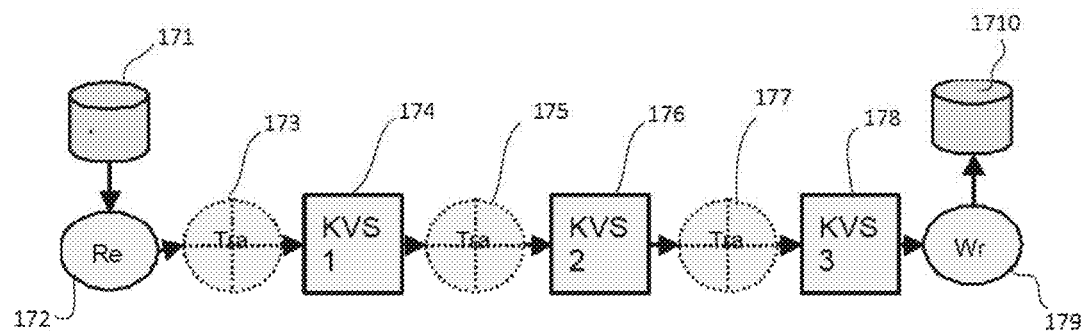
FIGS. 17A-17F show an example of a further fault tolerance mechanism according to an aspect of this disclosure.
Figure 17B:
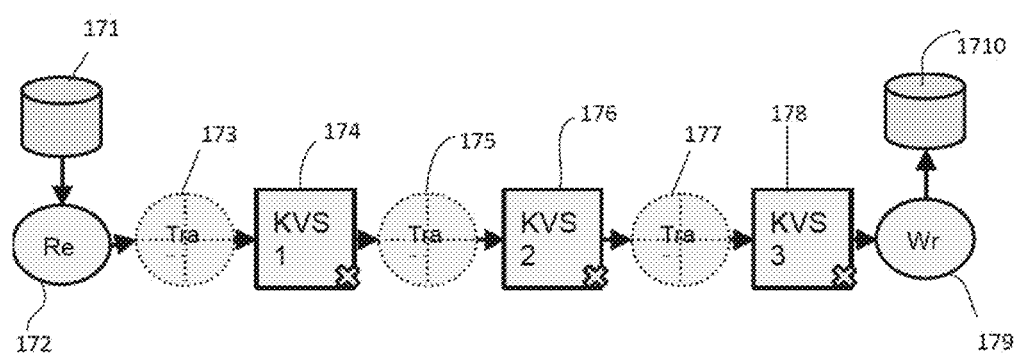
Figure 17C:
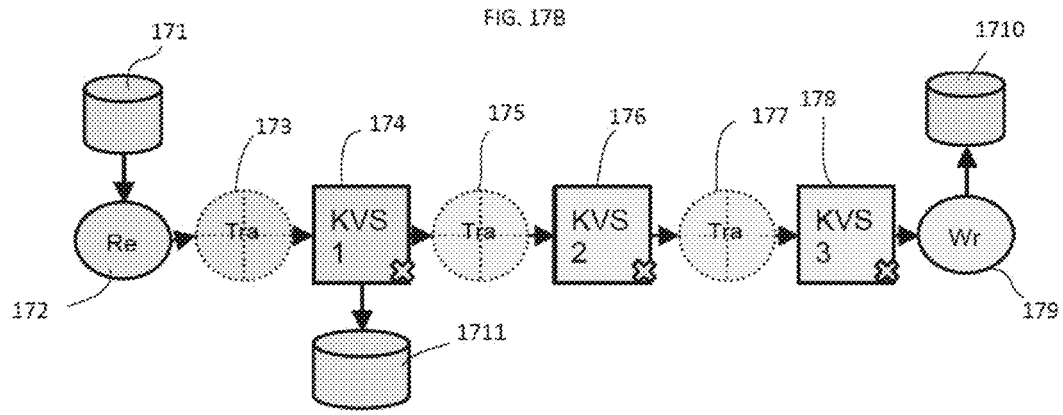
Figure 17D:
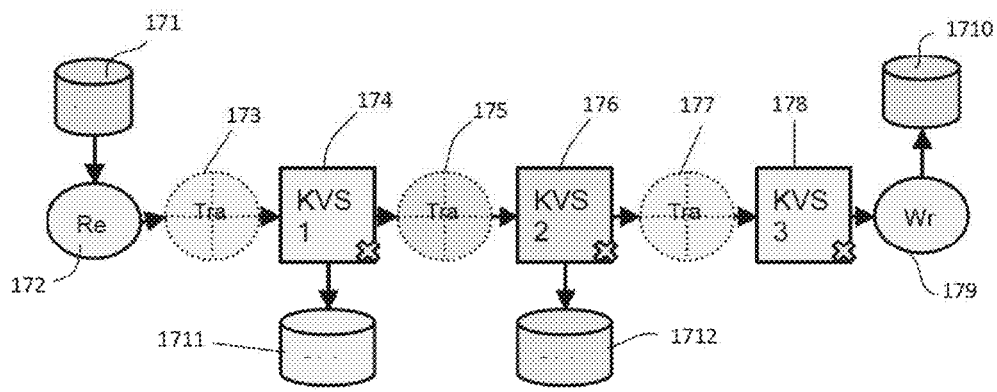
Figure 17E:
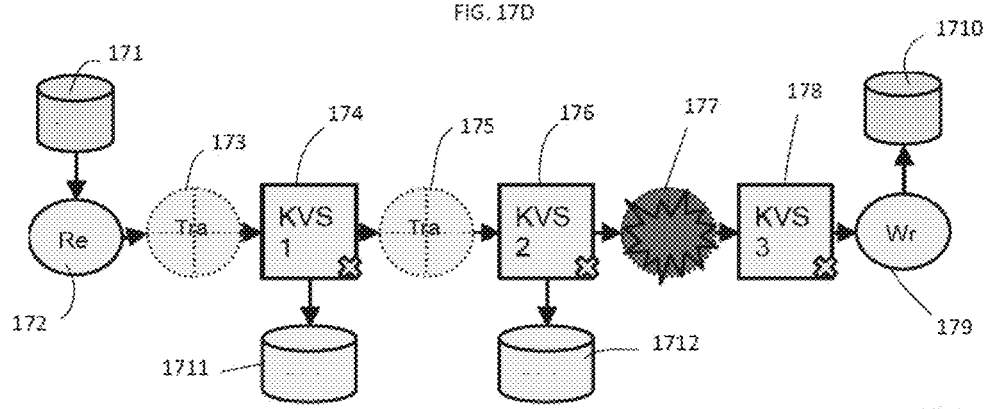
Figure 17F:
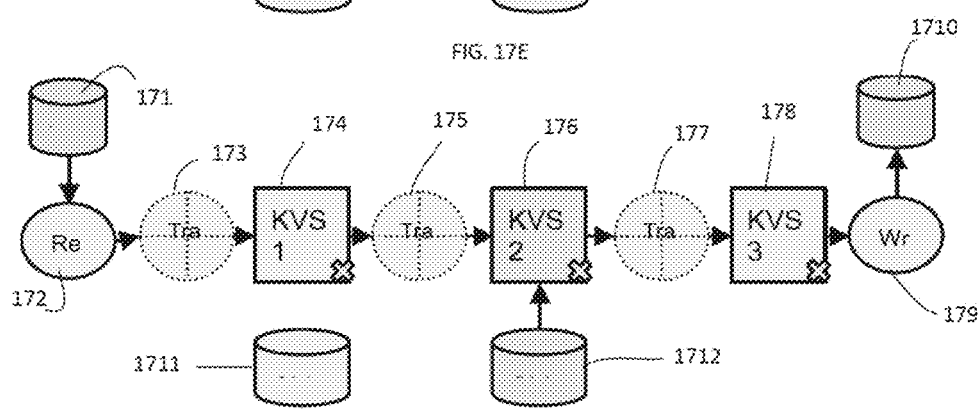

FIGS. 17A-17F show a step-by-step example of how KVS flowlets may be inserted into a workflow and used for checkpointing and recovery. FIG. 17A shows an example of a workflow having a data source 171, a read flowlet 172, a first processing flowlet 173, a first KVS flowlet (KVS1) 174, a second processing flowlet 175, a second KVS flowlet (KVS2) 176, a third processing flowlet 177, a third KVS flowlet (KVS3) 178, a write flowlet 179, and a data sink 1710. In FIG. 17B, all three KVS flowlets 174, 176, 178 may be designated as checkpoints (shown as an "x" in the lower right-hand corner of each respective block). In FIG. 17C, KVS1 174 may receive an upstream complete notification, e.g., from first processing flowlet 173 or from a controller/control logic (not shown). In response, KVS1 174 may write the data accumulated from upstream processing to storage 1711, which may, e.g., be a disk. In FIG. 17D, KVS2 176 may receive an upstream complete notification, e.g., from second processing flowlet 175 or from a controller/control logic (not shown). In response, KVS2 176 may write the data accumulated from upstream processing to storage 1712, which may, e.g., be a disk. FIG. 17E shows a failure at third processing flowlet 177. In FIG. 17F, following the failure, using the checkpointing by KVS2 176, the data accumulated at KVS2 176 may be retrieved from storage 1712, and processing may be resumed from that point, thus "fast-forwarding" the workflow past the first two processing flowlets 173, 175.

The techniques described herein may generally be scalable. There may be two main axes of scalability: compute elements and data storage. A goal of such a scalable system may be to use all of the compute elements and data storage elements of a computing system, or as many as possible, to help solve a large data processing problem. A further goal may be to increase throughput, for example, in a streaming application where key/value pairs arrive for processing according to some real-time constraint. The in-memory data storage on any node may be made accessible to all nodes through key-based indexing, as described above. The disk storage on any node may be made accessible through a distributed file system, such as, but not limited to, HDFS, Lustre, Panassas, etc. In general, disk storage may be accessed in large contiguous chunks. Instead of reading from a data store (in memory or on disk) and sending the data to a requestor, the compute request may be migrated to the compute node with the data on local disk, as described above. Downstream flowlets may be continuations of upstream flowlets, with specific data bound. The destination compute node of the continuation may be defined by the key in the key/value pair associated therewith.

The keys may be distributed among the compute nodes using any one-to-one mapping of key to compute node. One such mapping may be a deterministic hash function that turns every key into a number. The modulus of that number and the number of compute nodes may be taken as the destination compute node.

The continuation may be routed (by key) to the destination compute node for completion. In this way computation and data may be collocated to specific key-bound destinations to create a virtual key space of computation and data throughout a large machine. Typically, the key space may be orders of magnitude larger than the compute node space, so all or most compute nodes may be uniformly participating in the computation and storage needs. Participation may only be "mostly" uniform in some cases because the hash function may possibly create some imbalance if a large number of keys are bound to a specific compute node (or if the computations and/or data bound by the key are not uniformly distributed among the keys).

Compute nodes are discussed in the preceding. It is noted that such compute nodes may generally contain one or more processors or other computing elements of various types, and may also typically contain memory resources and/or other computer-readable media. In addition to memory, computer-readable media may include solid-state memory (RAM, ROM, flash, etc.), magnetic memory (e.g., a magnetic disk), optical memory (e.g., CD, DVD, laser disk, etc.), or other non-transitory forms of storage. A system that contains compute nodes may also include further computer-readable media not collocated with any particular compute node. A computer-readable medium may contain instructions that may cause the one or more processors or other computing elements to implement various techniques discussed above. Such instructions may also be downloaded or made available for download.

Additionally, the various techniques may also be implemented in the form of hardware and/or firmware, as well as in software, and/or in combinations thereof. Such implementations may include, for example, but are not limited to, implementations in the form of programmable logic devices (PLDs), application-specific integrated circuits (ASICs), etc., or combinations thereof.

It will be appreciated by persons skilled in the art that the present invention is not limited by what has been particularly shown and described hereinabove. Rather the scope of the present invention includes both combinations and subcombinations of various features described hereinabove as well as modifications and variations which would occur to persons skilled in the art upon reading the foregoing description and which are not in the prior art.

What is claimed is:

1. A method of performing fault-tolerant data processing in a distributed computing system, the method including:
   instantiating plural flowlets associated with a workflow, the workflow implementing a program for accomplishing at least one data processing task, on multiple compute nodes of the distributed computing system, wherein the plural flowlets include one or more key/value store (KVS) flowlets; and
   interconnecting the flowlets between one or more data sources and data sinks to form at least one directed acyclic graph between the one or more data sources and data sinks, wherein the at least one directed acyclic graph includes at least one of the one or more KVS flowlets;
   wherein the one or more KVS flowlets is a synchronous KVS flowlet configured to implement a barrier between operations that push key/value pairs toward a respective KVS flowlet and operations that pull key/value pairs from the respective KVS flowlet;
   wherein the one or more KVS flowlets dominate upstream data processing of one or more subsets of the multiple compute nodes in such a way that every path for data from one of the subsets of the multiple compute nodes to reach a downstream flowlet after one of the one or more KVS flowlets goes through the KVS flowlet.

2. The method of claim 1, further including performing checkpointing at one or more of the KVS flowlets.

3. The method of claim 2, wherein at least one KVS flowlet is interconnected at a point that permits free checkpointing, wherein the free checkpointing refers to a case in which upstream processing prior to the KVS flowlet is complete, no processing downstream of the KVS produces any output key/value pairs, and the KVS flowlet does not send any data upstream.

4. The method of claim 2, wherein the synchronous KVS flowlet is made synchronous by means of signaling to indicate that processing performed by flowlets located upstream of the KVS flowlet is complete.

5. The method of claim 1, further comprising storing a state of at least one flowlet to provide checkpointing.

6. The method of claim 1, further including downloading executable instructions configured to implement said instantiating and said implementing.

7. The method of claim 1, further including providing for download executable instructions configured to implement said instantiating and said implementing.

8. A fault-tolerant distributed computing system including:
   a plurality of compute nodes, wherein a compute node includes at least one processor and memory;
   wherein a plurality of flowlets associated with a workflow, the workflow implementing a program for accomplishing at least one data processing task, are instantiated on at least a subset of the compute nodes, and wherein the plurality of flowlets includes one or more key/value store (KVS) flowlets; and
   wherein the plurality of flowlets are interconnected to form one or more directed acyclic graphs between one or more data sources and one or more data sinks, wherein at least one of the directed acyclic graphs includes at least one of the one or more KVS flowlets;
   wherein the one or more KVS flowlets is a synchronous KVS flowlet configured to implement a barrier between operations that push key/value pairs toward a respective KVS flowlet and operations that pull key/value pairs from the respective KVS flowlet;
   wherein the one or more KVS flowlets dominate upstream data processing of one or more subsets of the multiple compute nodes in such a way that every path for data from one of the subsets of the multiple compute nodes to reach a downstream flowlet after one of the one or more KVS flowlets goes through the KVS flowlet.

9. The system of claim 8, wherein at least one of the KVS flowlets is configured to perform checkpointing.

10. The system of claim 9, wherein at least one KVS flowlet is interconnected at a point that permits free checkpointing, wherein the free checkpointing refers to a case in which upstream processing prior to the KVS flowlet is complete, no processing downstream of the KVS produces any output key/value pairs, and the KVS flowlet does not send any data upstream.

11. The system of claim 9, wherein the synchronous KVS flowlet is made synchronous by means of signaling to indicate that processing performed by flowlets located upstream of the KVS flowlet is complete.

12. The system of claim 9, further comprising at least one storage component associated with the least one of the KVS flowlets configured to perform checkpointing.

13. A non-transitory computer-readable medium containing executable instructions which, when executed by one or more processors, cause the one or more processors to:
   instantiate plural flowlets associated with a workflow, the workflow implementing a program for accomplishing at least one data processing task, on multiple compute nodes of the distributed computing system, wherein the plural flowlets include one or more key/value store (KVS) flowlets; and
   interconnect the flowlets between one or more data sources and data sinks to form at least one directed acyclic graph between the one or more data sources and data sinks, wherein the at least one directed acyclic graph includes at least one of the one or more KVS flowlets;
   wherein the one or more KVS flowlets is a synchronous KVS flowlet configured to implement a barrier between operations that push key/value pairs toward a respective KVS flowlet and operations that pull key/value pairs from the respective KVS flowlet;

wherein the one or more KVS flowlets dominate upstream data processing of one or more subsets of the multiple compute nodes in such a way that every path for data from one of the subsets of the multiple compute nodes to reach a downstream flowlet after one of the one or more KVS flowlets goes through the KVS flowlet.

* * * * *